Dec. 24, 1968 H. BAUER 3,418,161
PROCESS FOR PREPARING A MAGNETIC RECORDING ELEMENT
Filed Sept. 18, 1963
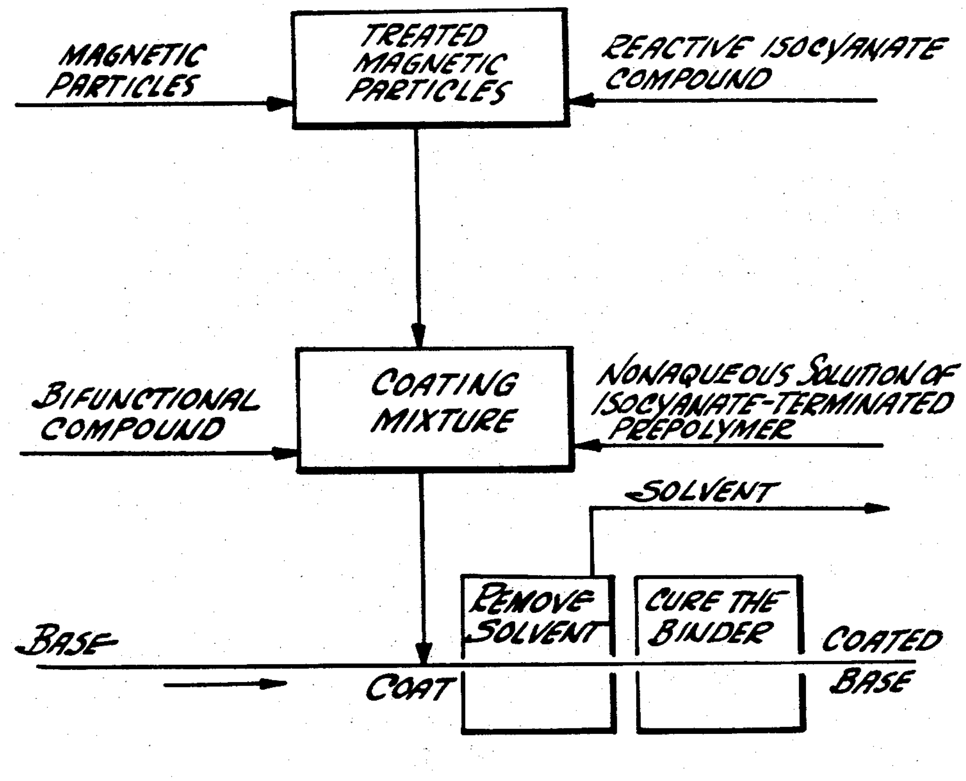
INVENTOR.
HERBERT BAUER
BY L. Greenspan
Attorney United States Patent Office 3,418,161
Patented Dec. 24, 1968

3,418,161

PROCESS FOR PREPARING A MAGNETIC RECORDING ELEMENT

Herbert Bauer, Metuchen, N.J., assignor to Radio Corporation of America, a corporation of Delaware Filed Sept. 18, 1963, Ser. No. 309,852
10 Claims. (Cl. 117—161)

This invention relates to a process for preparing a magnetic recording element comprising a coating of magnetic particles in a cured polyurethane binder.

Processes for preparing a magnetic recording element comprising magnetic particles in a cured polyurethane binder have been described previously. The steps of one previous process include preparing a dispersion of magnetic particles in a nonaqueous liquid containing an isocyanate-terminated prepolymer; adding to the dispersion a nonpolymeric bifunctional compound in an amount insufficient to react with all of the free isocyanate groups of said prepolymer to produce a coating mixture; coating the mixture on a base, and then drying and curing the coating. During drying and curing, the isocyanate groups link to the bifunctional compound and to one another to produce a cured or "thermoset" binder. This and similar processes using an isocyanate-terminated prepolymer produce useful recording elements which are characterized by a high resistance to abrasion and adequate recording characteristics.

Among the problems associated with this and similar processes are that the coating mixture tends to gel, and that the coating mixture has a short pot life. Also, nodules sometimes appear at the surface of the cured magnetic coating. These problems are believed to result from premature curing of the coating mixture. In particular, it is believed that, upon contact with one another, the prepolymer reacts with reactive centers located in or on the magnetic particles forming agglomerates including more or less cured binder. The reactive centers may be, for example, reactive surface bonds of the magnetic material per se, or may be adsorbed chemicals, such as water, on the surface of the particles.

An object of this invention is to provide an improved process for preparing a recording element including magnetic particles in a cured polyurethane binder.

Another object is to provide an improved method for preparing a recording element of the type described having an improved surface smoothness of the magnetic coating.

Still another object is to provide an improved method for preparing a recording element of the type described including a coating mixture having an extended pot life and a substantially reduced tendency to gel.

A further object is to provide an improved method for preparing a recording element of the type described having improved magnetic characteristics.

The objects of this invention may be achieved by a process which comprises treating the magnetic particles, prior to preparing the dispersion, by contacting the particles with a reactive isocyanate compound, either in a liquid medium or in the gas phase. The reactive centers in or on the magnetic particles react with the isocyanate compound rendering these centers inactive and forming a reaction product which is adherent to the particle surface, and which is compatible with the prepolymer that is subsequently added in the process.

By rendering the reactive centers on the magnetic particles inactive by the foregoing process step, the magnetic particles are more easily dispersed in the coating mixture, the coating mixture has a longer pot life, and the coating mixture has a reduced tendency to gel. The process of the invention is completed in the usual way, for example as described above, producing a coating having a smoother surface and improved magnetic properties compared to similar coatings produced with untreated particles.

A simplified flow diagram of the process of the invention is illustrated in the sole figure of the drawing.

In the process of the flow diagram, the magnetic particles may be any of the usual magnetic particles used in magnetic recording elements. For example, one may use metallic particles, such as iron particles, or oxidic particles, such as gamma iron oxide, magnetite, zinc ferrous ferrite, or chromium dioxide. The preferred magnetic particles are of the oxidic type, are elongated or acicular in shape, and are preferably between 0.2 and 2.0 microns long, between 0.02 and 0.6 micron wide, and have an average length-to-width ratio between about 2 and 20, but usually about 6.

Any of a wide variety of reactive isocyanate compounds may be used to treat the magnetic particles. The reactive isocyanate compounds may be used as liquids, as gases, or as nonaqueous solutions. The preferred reactive isocyanate compounds are selected from the class consisting of aromatic and aliphatic diisocyanates. Some representative compounds which may be used are phenyl isocyanate, dodecyl isocyanate, tolylene diisocyanate, m-phenylene diisocyanate, 4-chloro-1,3-phenylene diisocyanate, 4,4'-biphenylene diisocyanate, 1,5-naphthalene diisocyanate, 1,6-hexamethylene diisocyanate, 1,4-cyclohexylene diisocyanate, and 1,5-tetrahydronaphthalene diisocyanate.

In general, the magnetic particles may be treated by contacting them with a reactive isocyanate compound. The treatment may be carried out by contacting the particles in dry form with the isocyanate compound in gaseous form. Preferably, this gaseous treatment is carried out in a closed chamber in an atmosphere that is essentially saturated with the isocyanate compound, at elevated temperatures, preferably between 100 and 200° C., until the treatment is completed, which is usually of the order of about 1 hour.

The treatment may also be carried out by contacting the magnetic particles with a liquid isocyanate compound or with a nonaqueous solution of an isocyanate compound. In either case, it is preferred to mill the magnetic particles in the liquid medium until the treatment is completed. The preferred method is to mill the magnetic particles in a nonaqueous solution of an isocyanate compound maintained between 15 and 30° C. for between 1 and 4 hours. Milling is preferred because the surfaces of the particles intimately contact substantial amounts of the solution. Generally, the higher the temperature of the solution, the faster the reaction proceeds. However, too rapid a reaction rate results in agglomerates of the magnetic particles. It is preferred for the reaction to proceed at the fastest rate consistent with producing a uniform dispersion of treated particles in the solution. Milling is helpful in reducing the tendency of the particles to agglomerate at the faster reaction rate.

After the particles have been treated, the coating mixture is prepared. Where the treatment is carried out in a solution of an isocyanate compound or in a liquid isocyanate compound, the additional constituents (the prepolymer and the bifunctional compound) may be added to the dispersion of treated particles without drying the particles. Where the particles have been subjected to the gaseous treatment, they are first dispersed in a nonaqueous liquid such as methyl ethyl ketone and the additional constituents are added to this dispersion.

The coating mixture is prepared by adding to the dispersion of magnetic particles in the nonaqueous medium, a nonaqueous solution of an isocyanate-terminated prepolymer and then, subsequently adding a bifunctional compound. The prepolymer may be prepared in a known manner, for example, as described in U.S. Patent 2,948,707 to A. F. Benning. Generally, the prepolymer is prepared by reacting a molar excess of an organic diisocyanate with one or more polymeric organic compounds having a molecular weight of at least 750 and having two terminal hydroxyl groups and selected from the group consisting of (1) polyalkyleneether glycols, such as polytetramethyleneether glycol, polypropyleneether glycol and poly-1,2-butyleneether glycol, (2) polyalkylenearyleneether glycols, (3) polyalkyleneether-thioether glycols, (4) polyalkylene-aryleneether-thioether glycols, (5) linear, dihydroxy terminated polyesters, such as are prepared in a known manner by esterification of dihydric alcohols, such as ethylene glycol, diethylene glycol, propylene glycol, 1,4-butylene glycol with dibasic organic acids such as adipic acid, glutaric acid, subercic acid, sebacic acid and (6) linear, dihydroxy-terminated polyester amides.

Any of a wide variety of organic diisocyanates may be used in the foregoing reaction including aromatic, aliphatic, and cycloaliphatic diisocyanates, and combinations of these types. Representative compounds include tolylene diisocyanate, m-phenylene diisocyanate, 4-chloro-1,3-phenylene diisocyanate, 4,4'-biphenylene diisocyanate, 1,5-naphthalene diisocyanate, 1,6-hexamethylene diisocyanate, 1,4-cyclohexylene diisocyanate and 1,5-tetrahydronaphthalene diisocyanate.

Any of a wide variety of bifunctional compounds may be used in preparing the coating mixture. The bifunctional compounds preferably have at least two hydrogen atoms which are capable of reacting with isocyanates. Some suitable bifunctional compounds are water, ethylene glycol, hexamethylene glycol, monoethanolamine, m-phenylenediamine, 4,4'-methylene dianiline and 4,4'-methylene-bis-(2-chloroaniline).

In preparing the coating mixture, it is preferred to mill the dispersion of magnetic particles with the isocyanate-terminated prepolymer. The milling may be continued between about 1 and 10 hours at temperatures between about 15 and 30° C. The bifunctional compound is added to the milled dispersion and the dispersion is remilled for a period of between 0.1 and 4 hours at about room temperature to produce the coating mixture. The coating mixture is milled in a container which is closed from the atmosphere and particularly from water and water vapor, which has the effect of accelerating the curing of the mixture. The coating mixture may be stored for a substantial period of time in such a container which is closed from the atmosphere. It is preferred, however, to produce the magnetic coating as soon as possible after the coating mixture is prepared.

The coating is produced by any of the processes known in the art. As shown in the flow diagram, a base is coated with the coating mixture and then dried to remove the solvent from the coating and finally the binder is cured to produce the final product. The base is preferably an oriented polyethylene terephthalate film, such as Mylar, which is a trademark of E. I. du Pont de Nemours and Co., Wilmington, Del. Other suitable bases are made of paper, cellulose acetate, nylon, and oriented polyvinyl chloride. The base is typically 1.5 mils thick, although other thicknesses usually between 0.25 and 5.0 mils may be used. The film base may be of any convenient width for example, between 0.25 and 4.0 inches; and may be of any length usually thousands of feet.

The coating may be carried out by spraying, dipping, transfer roll coating, or gravure roll coating, but is preferably carried out by the process known as doctor blading. In the doctor blading process, the base passes under a doctor blade or knife which has a quantity of a coating mixture behind it. As the film base passes under the doctor blade, a thin coating is deposited on the base. The blade or knife is adjusted to apply a quantity of coating mixture to the surface of the base which will provide a dry coating between 0.1 and 2.0 mils thick; preferably 0.5 mil thick. After the coating mixture is applied, the coating passes through a magnetic field to orient the magnetic particles therein in a desired direction.

After orienting the magnetic particles, the coating is dried in a dryer by removing the solvent therefrom. The dry structure is then heated for a short period. The heating is carried out in a curing region in a separate oven or near the exit end of the drying oven. The heating is finally conducted at about 100 to 130° C. for about 1 to 30 minutes. The final heating after the solvent is removed solidifies the coating sufficiently to permit the coated base to be wound on a take-up roller without sticking or blocking. Following this heating, the coated base is cooled and then wound on a take-up roll. At this stage, the coating is partially cured. The cure is completed by storing the wound roll for periods of one hour to several days at temperatures between about 40 and 120° C. During which period the cross linking reaction is completed. The coated base may now be slit to any desired width.

The following examples illustrate specifically several methods for practicing the invention:

Example 1

A mixture of 584 g. of acicular gamma iron oxide particles, 660 g. methyl ethyl ketone, and 54 g. tolylene diisocyanate was milled for about 3 hours at about room temperature. To this mixture were added 216 g. of an isocyanate-terminated prepolymer formed by the reaction of tolylene diisocyanate with poly-(1,4-butanediol), 100 g. of methyl ethyl ketone and 23 g. lecithin. The mixture was milled for another ten hours at room temperature. To the slurry thus formed, 54 g. of 4,4'-methylene-bis-(2-chloroaniline) and 100 g. of methyl ethyl ketone were added and the milling was continued for two hours at room temperature. The resulting mixture was coated on a polyester film and the coated structure was heated to 120° C. for ten minutes. The magnetic tape made in this manner exhibited a surface smoothness of 6 microinches (root mean square), a retentivity $B_r$ of 920 gauss, and a $B_r/B_{1000}$ of 0.80. A tape made in an identical fashion but not including the tolylene diisocyanate during the initial milling exhibited a surface smoothness of 16 microinches (root mean square), a retentivity of 780 gauss, and a $B_r/B_{1000}$ of 0.74.

Example 2

A mixture of 24 g. of acicular zinc ferrous ferrite particles, 45 g. of methyl ethyl ketone, and 2.0 g. of tolylene diisocyanate was milled for about three hours at about 15° C. To this mixture were added 6.6 g. of an isocyanate-terminated prepolymer formed by the reaction of tolylene diisocyanate with poly-(1,4-butanediol), 12 g. of methyl ethyl ketone, 0.5 g. of Nuosperse 657, a product of Nuodex Products Co., Elizabeth, N.J., and 2.0 g. of 4,4' methylene-bis-(2-chloroaniline) and milling was continued for about four hours at about 15° C. The resulting mixture was coated on a polyester film and the coated structure was heated to about 100° C. for about 15 minutes. The magnetic tape made in this manner exhibited a surface smoothness of 8 microinches (root mean square), a retentivity of 1050 gauss, and a $B_r/B_{1000}$ of 0.78. A tape made in an identical manner but omitting the tolylene diisocyanate in the initial milling, had a surface smoothness of 16 microinches (root mean square), a retentivity of 900 gauss, and $B_r/B_{1000}$ of 0.74.

Example 3

A mixture of 26 g. chromium dioxide particles, which have been surface treated with a Werner-type complex compound of chromium cations and stearic acid, 24 g. methyl ethyl ketone, and 2.0 g. tolylene diisocyanate was milled for about two hours at about room temperature. To this mixture were added 7.0 g. of a bifunctional isocyanate-terminated prepolymer formed by the reaction of tolylene diisocyanate with poly-(1,4-butanediol), 7.0 g. of methyl ethyl ketone and 1.7 g. of 4,4'-methylene-bis-(2-chloroaniline) and milling was continued for about four hours at about 20° C. The resulting mixture was coated on a polyester film and the coated structure was heated at about 100° C. for about 15 minutes. The magnetic recording element made in this manner exhibited a surface smoothness of 8 microinches (root mean square), a retentivity of 1250 gauss, and a ratio of $B_r/B_{1000}$ of 0.87. A magnetic recording element made in an identical manner but omitting the tolylene diisocyanate in the initial milling, had a surface smoothness of 16 microinches (root mean square), a retentivity of 960 gauss, and a $B_r/B_{1000}$ of 0.83.

Example 4

A vessel containing 50 g. of acicular gamma iron oxide particles was evacuated to a pressure of 0.5 mm. of mercury and heated to a temperature of about 140° C. The vessel was closed from the vacuum system and about 1.8 g. of phenyl isocyanate was introduced into the vessel, where it evaporated, producing a substantially saturated atmos-mercury at 160° C. for one hour to remove the isocyanate compound. Thereafter, the vessel was allowed to cool to phere. The vessel, still closed from the vacuum system, was heated to about 160° C. for about three hours. The vessel was then evacuated to a pressure of 0.5 mm. of room temperature and the treated iron oxide removed. The treated gamma iron oxide particles thus obtained were hydrophobic and oleophilic. A mixture of 25 g. of the treated gamma iron oxide particles, 32 g. of methyl ethyl ketone, 1.0 g. of lecithin, and 11 g. of an isocyanate-terminated prepolymer formed by the reaction of tolylene diisocyanate with poly-(1,4-butanediol) was milled for about 5.5 hours. After this period, 3.6 g. of a 33% (by weight) solution of 4,4′-methylene-bis-(2-chloroaniline) in methyl ethyl ketone were added to the mixture and milling was continued for another 30 minutes. The resulting mixture was coated on a polyester film and heated to about 120° C. for about ten minutes. The recording element made in this fashion had a retentivity $B_r$ of about 860 gauss, a surface smoothness of 10 microinches (RMS), and a $B_r/B_{1000}$ of 0.79. A recording element made in an essentially identical manner, but substituting an untreated gamma iron oxide for the treated iron oxide, had a surface smoothness of 16 microinches (RMS), a retentivity of about 780 gauss, and a $B_r/B_{1000}$ of about 0.74.

What is claimed is:

1. A method for preparing a magnetic recording element comprising (1) treating magnetic particles by contacting said particles with a reactive isocyanate compound selected from the group consisting of aromatic and aliphatic isocyanates, (2) preparing a dispersion of said treated particles in a nonaqueous medium, containing an isocyanate-terminated prepolymer, (3) adding to said dispersion a nonpolymeric bifunctional compound having at least two hydrogen atoms which are capable of reacting with isocyanate groups, said bifunctional compound being added in an amount insufficient to react with all of the free isocyanate groups in said prepolymer to produce a coating mixture, (4) coating a base with said coating mixture, (5) and then curing said coating.

2. A method for preparing a magnetic recording element comprising (1) treating magnetic particles by contacting said particles with a reactive isocyanate compound from the class consisting of aromatic and aliphatic isocyanates, (2) preparing a dispersion of said treated particles in a nonaqueous medium containing an isocyanate-terminated prepolymer, (3) adding to said dispersion a nonpolymeric bifunctional compound having at least two hydrogen atoms which are capable of reacting with isocyanate groups, said bifunctional compound being added in an amount insufficient to react with all of the free isocyanate groups in said prepolymer to produce a coating mixture, (4) coating a base with said coating mixture, (5) and then heating said coated base at temperatures between 40 and 170° C.

3. A method for preparing a magnetic recording element comprising (1) treating magnetic particles by contacting said particles with a reactive aromatic or aliphatic isocyanate compound dissolved in a nonaqueous liquid, (2) dispersing said treated particles in a nonaqueous liquid containing an isocyanate-terminated prepolymer, (3) adding to said dispersion a nonpolymeric bifunctional compound having at least two hydrogen atoms which are capable of reacting with isocyanate groups, said bifunctional compound being added in an amount insufficient to react with all of the free isocyanate groups in said prepolymer to produce a coating mixture, (4) coating a base with said coating mixture, (5) and then heating said coated base at temperatures between 40 and 170° C. until said coating is at least partially cured.

4. A method for preparing a magnetic recording element comprising (1) treating magnetic particles by contacting said particles with a reactive aromatic or aliphatic isocyanate compound in gaseous form, (2) dispersing said treated particles in a nonaqueous liquid containing an isocyanate-terminated prepolymer, (3) adding to said dispersion a nonpolymeric bifunctional compound having at least two hydrogen atoms which are capable of reacting with isocyanate groups, said bifunctional compound being added in an amount insufficient to react with all of the free isocyanate groups in said prepolymer to produce a coating mixture, (4) coating a base with said coating mixture, (5) and then heating said coated base at temperatures between 40 and 170° C. until said coating is at least partially cured.

5. A method for preparing a magnetic recording tape comprising (1) dispersing gamma iron oxide in a nonaqueous solution of tolylene diisocyanate in a solvent therefor, (2) adding to the dispersion an isocyanate terminated prepolymer formed by the reaction of tolylene diisocyanate with poly-(1,4-butanediol), (3) milling said dispersion, (4) adding to said milled dispersion 4,4′-methylene-bis-(2-chloroaniline) in a nonaqueous solvent, (5) remilling said dispersion, (6) coating said remilled dispersion upon a polyester film base, (7) heating said coated base for about 10 minutes at about 120° C.

6. A method for preparing a magnetic recording tape comprising (1) dispersing zinc ferrous ferrite in a nonaqueous solution of tolylene diisocyanate in a solvent therefor, (2) adding to the dispersion an isocyanate terminated prepolymer formed by the reaction of tolylene diisocyanate with poly-(1,4-butanediol), (3) milling said dispersion, (4) adding to said milled dispersion 4,4′-methylene-bis-(2-chloroaniline) in a nonaqueous solvent, (5) remilling said dispersion, (6) coating said remilled dispersion upon a polyester film base, (7) heating said coated base for about 15 minutes at about 100° C.

7. A method for preparing a magnetic recording tape comprising (1) dispersing chromium dioxide particles in a nonaqueous solution of tolylene diisocyanate in a solvent therefor, (2) adding to the dispersion an isocyanate terminated prepolymer formed by the reaction of tolylene diisocyanate with poly-(1,4-butanediol), (3) milling said dispersion, (4) adding to said milled dispersion 4,4′-methylene-bis-(2-chloroaniline) in a nonaqueous solvent, (5) remilling said dispersion, (6) coating said remilled dispersion upon a polyester film base, (7) heating said coated base for about 15 minutes at about 100° C.

8. A method for preparing a magnetic recording tape comprising (1) contacting gamma iron oxide particles with gaseous phenyl isocyanate, (2) dispersing said contacted particles in a nonaqueous solution of an isocyanate terminated prepolymer formed by the reaction of tolylene diisocyanate with poly-(1,4-butanediol), (3) milling said dispersion, (4) adding to said milled dispersion 4,4′-methylene-bis-(2-chloroanaline) in a nonaqueous solvent, (5) remilling said dispersion, (6) coating said remilled dispersion upon a polyester film base, (7) heating said coated base for about 10 minutes at about 120° C.

9. A method for preparing a magnetic recording element comprising the steps of:

(1) treating magnetic particles by contacting said particles with a reactive aromatic isocyanate compound, (2) preparing a coating mixture of said treated particles in a nonaqueous medium, containing an isocyanate-terminated prepolymer and a polyhydroxy compound, (3) coating a base with said coating mixture, and (4) curing said coating.

10. A method for preparing a magnetic recording element comprising:

(1) treating magnetic particles by contacting said particles with a reactive isocyanate compound, (2) preparing a coating mixture of said treated particles in a non-aqueous medium containing an isocyanate-terminated prepolymer and a bifunctional compound having at least two hydrogen atoms which are capable of reacting with isocyanate groups, (3) coating a base with said coating mixture, and (4) curing said coating.

References Cited

UNITED STATES PATENTS

| | | | |
|---|---|---|---|
| 2,989,415 | 6/1961 | Horton et al. | 117—31 |
| 3,042,639 | 7/1962 | Adams et al. | 117—235 X |
| 3,077,444 | 2/1963 | Hoh | 117—235 X |
| 3,150,995 | 9/1964 | Bauer | 117—138.8 X |
| 3,200,007 | 8/1965 | Flowers | 117—138.8 X |
| 3,216,848 | 11/1965 | Hendricx et al. | 117—62 |
| 3,228,881 | 1/1966 | Thomas | 117—235 X |
| 3,242,005 | 3/1966 | Morita et al. | 117—235 |
| 3,247,017 | 4/1966 | Eichler et al. | 117—235 |

WILLIAM D. MARTIN, *Primary Examiner.*

B. PIANALTO, *Assistant Examiner.*

U.S. Cl. X.R.

252—62.54; 117—138.8, 7, 100